United States Patent
Misu

(10) Patent No.: US 8,976,397 B2
(45) Date of Patent: Mar. 10, 2015

(54) IMAGE FORMING APPARATUS AND IMAGE FORMING METHOD TO OUTPUT IN AN APPROPRIATE SEQUENCE

(71) Applicant: Kyocera Document Solutions Inc., Osaka (JP)

(72) Inventor: Kazuto Misu, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 13 days.

(21) Appl. No.: 14/061,425

(22) Filed: Oct. 23, 2013

(65) Prior Publication Data

US 2014/0118783 A1    May 1, 2014

(30) Foreign Application Priority Data

Oct. 29, 2012 (JP) ................... 2012-237535

(51) Int. Cl.
G06F 3/12 (2006.01)
G06K 15/02 (2006.01)

(52) U.S. Cl.
CPC ........ G06K 15/1856 (2013.01); G06K 15/1822 (2013.01)
USPC ......................................... 358/1.15

(58) Field of Classification Search
USPC ......................................... 358/1.15
See application file for complete search history.

(56) References Cited

U.S. PATENT DOCUMENTS

2007/0127060 A1* 6/2007 Matsuo .................. 358/1.15

FOREIGN PATENT DOCUMENTS

JP          11-024855           1/1999

* cited by examiner

Primary Examiner — Marivelisse Santiago Cordero
Assistant Examiner — Mesfin Getaneh
(74) Attorney, Agent, or Firm — K&L Gates LLP

(57) ABSTRACT

An image forming apparatus includes a print engine configured to perform printing on a recording medium, a job issuing unit configured to issue a print job, two print control units configured to control the print engine in accordance with the issued print job, and a job allocating unit configured to allocate the print job to an appropriate print control unit, among the two print control units. If a last print job that is issued is for a first print control unit, the control of the print engine by the first print control unit in accordance with the last print job allocated to the first print control unit is not completed, and a next print job that is issued is for a second print control unit, the job allocating unit is configured to place on standby the allocation of the next print job to the second print control unit.

4 Claims, 10 Drawing Sheets

| ORDER | JOB ID | JOB TYPE | STATE |
|---|---|---|---|
| 3 | JOB102 | MFP PRINT SYSTEM PRINT JOB | STANDBY |
| 2 | JOB101 | OPTION PRINT SYSTEM PRINT JOB | STANDBY |
| 1 | JOB100 | MFP PRINT SYSTEM PRINT JOB | ALLOCATED STATE |

FIG 9A

| ORDER | JOB ID | JOB TYPE | STATE |
|---|---|---|---|
| 3 | JOB202 | MFP PRINT SYSTEM PRINT JOB | STANDBY |
| 2 | JOB201 | OPTION PRINT SYSTEM PRINT JOB | ALLOCATED STATE |
| 1 | JOB200 | OPTION PRINT SYSTEM PRINT JOB | ALLOCATED STATE |

FIG 9B

| ORDER | JOB ID | JOB TYPE | STATE |
|---|---|---|---|
| 3 | JOB302 | MFP PRINT SYSTEM PRINT JOB | ALLOCATED STATE |
| 2 | JOB301 | MFP PRINT SYSTEM PRINT JOB | ALLOCATED STATE |
| 1 | JOB300 | MFP PRINT SYSTEM PRINT JOB | ALLOCATED STATE |

FIG 9C

IMAGE FORMING APPARATUS AND IMAGE FORMING METHOD TO OUTPUT IN AN APPROPRIATE SEQUENCE

INCORPORATION BY REFERENCE

This application is based upon, and claims the benefit of priority from, corresponding Japanese Patent Application No. 2012-237535 filed in the Japan Patent Office on Oct. 29, 2012, the entire contents of which are incorporated herein by reference.

BACKGROUND

Unless otherwise indicated herein, the description in this section is not prior art to the claims in this application and is not admitted to be prior art by inclusion in this section.

The present disclosure relates to an image forming apparatus that performs printing on a recording medium.

A typical image forming apparatus includes a printer engine that performs printing on a print sheet, two controllers that control the printer engine in accordance with a print job, and a reception data allocation unit that allocates the print job to an appropriate controller among the two controllers. The reception data allocation unit determines whether reception data is mainly composed of text data or graphic data to allocate the print job to an appropriate controller in accordance with the type of the reception data. The reception data allocation unit allocates the reception data to a text data controller if the reception data allocation unit determines that the reception data is mainly composed of the text data, and allocates the reception data to a graphic data controller if the reception data allocation unit determines that the data is mainly composed of graphic data.

However, when the process time by the text data controller is different from that of the graphic data controller, a printout based on the data mainly composed of the text data and a printout based on the data mainly composed of the graphic data may possibly be outputted in an inappropriate sequence.

SUMMARY

According to an embodiment of the present disclosure, an image forming apparatus includes a print engine, a job issuing unit, two print control units, and a job allocating unit. The print engine performs printing on a recording medium. The job issuing unit issues a print job for the printing by the print engine. The two print control units control the print engine in accordance with the print job issued by the job issuing unit. The job allocating unit allocates the print job to an appropriate print control unit, among the two print control units. If a last print job is for a first print control unit, among of the two print control units, the control of the print engine by the first print control unit in accordance with the last print job allocated to the first print control unit is not completed, and a next print job is for a second print control unit, among the two print control units, the job allocating unit places on standby the allocation of the next print job to the second print control unit.

According to another embodiment of the present disclosure, an image forming method includes performing printing on a recording medium by a print engine; issuing a print job for printing by the print engine; controlling the print engine in accordance with the issued print job by two print control units; and allocating the issued print job to an appropriate print control unit, among the two print control units. If a last print job that is issued is for a first print control unit, among the two print control units, the control of the print engine by the first print control unit in accordance with the last print job allocated to the first print control unit is not completed, and a next print job that is issued is for a second print control unit, among the two print control units, the allocation of the next print job to the second print control unit is placed on standby.

Additional features and advantages are described herein, and will be apparent from the following Detailed Description and the figures.

BRIEF DESCRIPTION OF THE FIGURES

In the accompanying drawings:

FIG. 9A illustrates an example of queue managed by the arbitrator illustrated in FIG. 3;

FIG. 9B illustrates another example of queue managed by the arbitrator illustrated in FIG. 3, which is different from the example of queue illustrated in FIG. 9A;

FIG. 9C illustrates another example of queue managed by the arbitrator illustrated in FIG. 3, which is different from the example of queues illustrated in FIG. 9A and FIG. 9B.

DETAILED DESCRIPTION

Example apparatus and method are described herein. Other example embodiments or features may further be utilized, and other changes may be made, without departing from the spirit or scope of the subject matter presented herein. In the following detailed description, reference is made to the accompanying drawings, which form a part thereof.

Embodiments of the present disclosure will herein be described with reference to the attached drawings.

Figure 1:
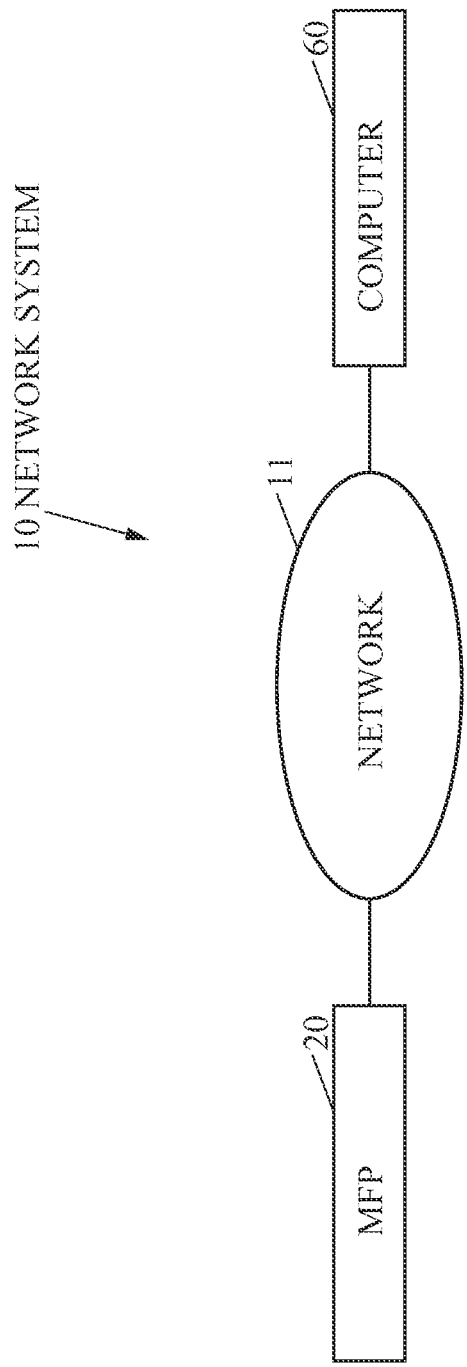
FIG. 1 shows a block diagram illustrating a configuration of a network system according to an embodiment of the present disclosure.

The configuration of a network system according to an embodiment will now be described. FIG. 1 shows a block diagram illustrating a configuration of a network system 10 according to an embodiment.

Referring to FIG. 1, the network system 10 includes a multifunction peripheral ("MFP") 20 functioning as an image forming apparatus and a computer 60, such as a personal computer ("PC"), capable of transmitting print data to the MFP 20. The MFP 20 and the computer 60 are connected to each other via a network 11, such as a local area network ("LAN") or the Internet, so as to be capable of communicating with each other.

Figure 2:
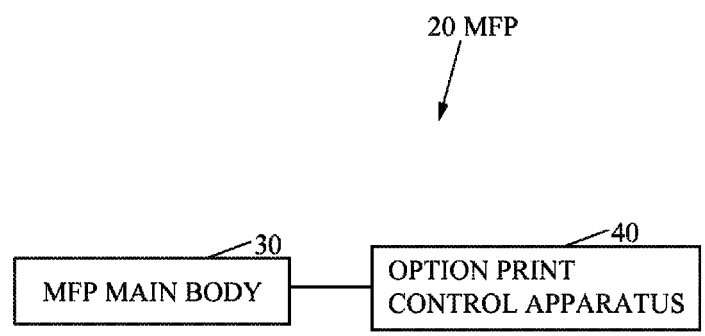
FIG. 2 shows a block diagram illustrating a configuration of an MFP illustrated in FIG. 1.

FIG. 2 shows a block diagram illustrating a configuration of the MFP 20.

Referring to FIG. 2, the MFP 20 includes an MFP main body 30 and an option print control apparatus 40. The MFP main body 30 performs printing on a recording medium, such as a sheet of paper. The option print control apparatus 40 is connected to the MFP main body 30 as an optional apparatus in order to improve a print function with the MFP main body 30. The MFP main body 30 is capable of performing printing even in a single state in which the option print control apparatus 40 is not connected to the MFP main body 30.

Figure 3:
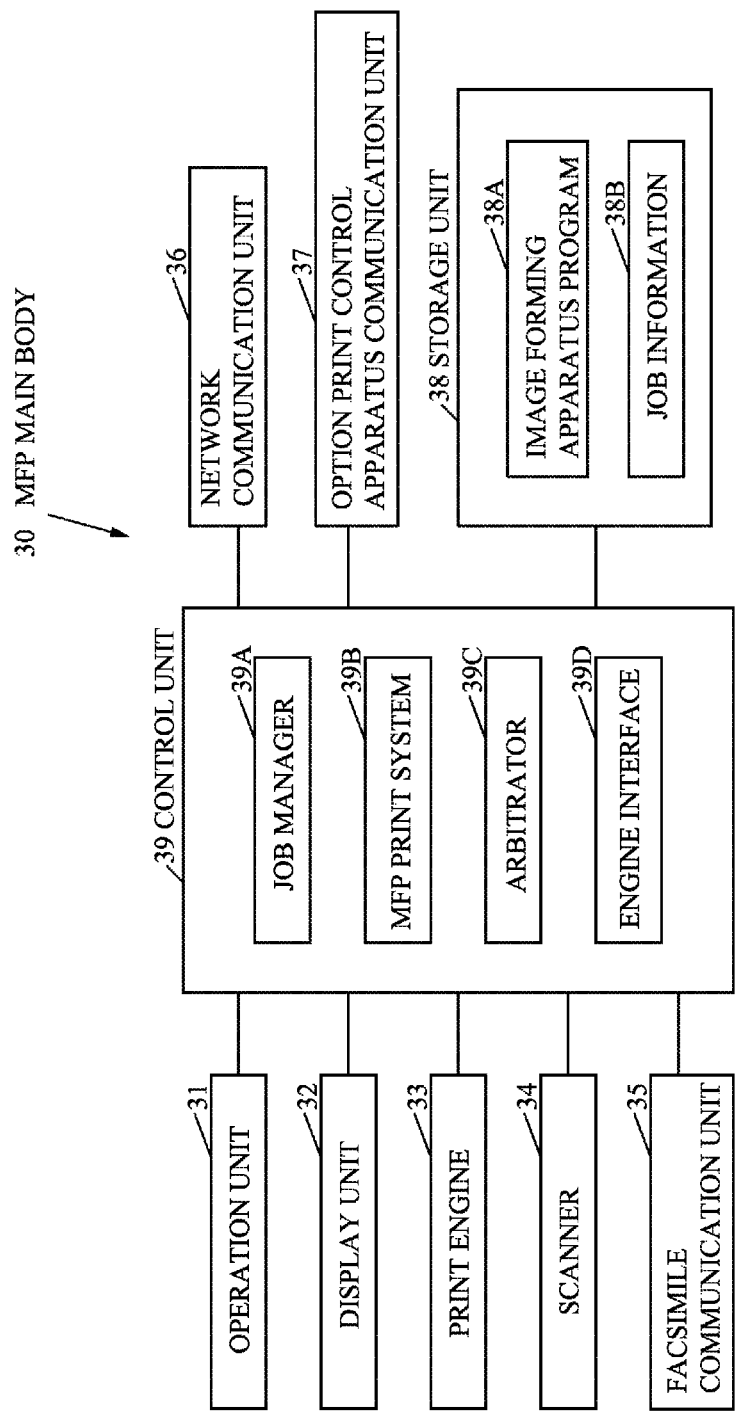
FIG. 3 shows a block diagram illustrating a configuration of an MFP main body illustrated in FIG. 2.

FIG. 3 shows a block diagram illustrating a configuration of the MFP main body 30.

Referring to FIG. 3, the MFP main body 30 includes an operation unit 31, a display unit 32, a print engine 33, a scanner 34, a facsimile communication unit 35, a network communication unit 36, an option print control apparatus communication unit 37, a storage unit 38, and a control unit 39. The operation unit 31 is an input device, such as buttons, with which various operations are inputted by a user. The display unit 32 is a display, such as a liquid crystal display ("LCD"), which displays a variety of information. The print engine 33 is a printer that prints on a recording medium. The scanner 34 is a scanning device that scans an image of a document. The facsimile communication unit 35 performs facsimile communication with an external facsimile apparatus (not illustrated) via a communication line, such as a public telephone circuit. The network communication unit 36 performs communication with an external apparatus via the network 11. The option print control apparatus communication unit 37 performs communication with the option print control apparatus 40. The storage unit 38 is a storage device, such as an electrically erasable and programmable read only memory ("EEPROM") or a hard disk drive ("HDD"), capable of storing a variety of information. The control unit 39 controls the entire MFP main body 30.

The operation unit 31 may include an input device that comprises a touch panel with the display unit 32.

The storage unit 38 stores an image forming apparatus program 38A and job information 38B. The image forming apparatus program 38A is executed by the MFP main body 30. The job information 38B relates to a print job used for the printing with the print engine 33.

The image forming apparatus program 38A may be installed in the MFP main body 30 during the manufacturing process of the MFP main body 30, may be additionally installed in the MFP main body 30 from a storage medium, such as a secure digital ("SD") card or a universal serial bus ("USB") memory, or may be additionally installed in the MFP main body 30 from the network 11.

Figure 4:
FIG. 4 illustrates an example of job information illustrated in FIG. 3.

FIG. 4 illustrates an example of the job information 38B.

Referring to FIG. 4, the job information 38B associates a job identifier ("ID") serving as job identification information, which is identification information about a print job, with job type information. The job type information indicates whether the print job is for an MFP print system 39B described below or an option print system 43A described below.

For example, in the job information 38B illustrated in FIG. 4, the job type information about a print job, the job ID of which is "Job001", is an "MFP print system print job." The job type information about a print job, the job ID of which is "Job002", is an option print system print job."

The control unit 39 illustrated in FIG. 3 includes, for example, a central processing unit ("CPU"), a read only memory ("ROM"), and a random access memory ("RAM"). The CPU executes a program stored in the ROM or the storage unit 38. The ROM stores programs and a variety of data in advance. The RAM is used as a working area of the CPU.

The control unit 39 functions as a job manager 39A, the MFP print system 39B, an arbitrator 39C, and an engine interface 39D. The job manager 39A executes the image forming apparatus program 38A stored in the storage unit 38 to function as a job issuing unit that issues a print job. The MFP print system 39B controls the print engine 33 in accordance with the print job issued by the job manager 39A. The arbitrator allocates the print job issued by the job manager 39A to an appropriate print control unit, among the MFP print system 39B and the option print system 43A described below. The engine interface controls the communication with the print engine 33.

The MFP print system 39B performs a drawing process corresponding to the print job. The MFP print system 39B is capable of instructing the print engine 33 to perform post-process, such as punching or stapling, in accordance with the print job.

Figure 5:
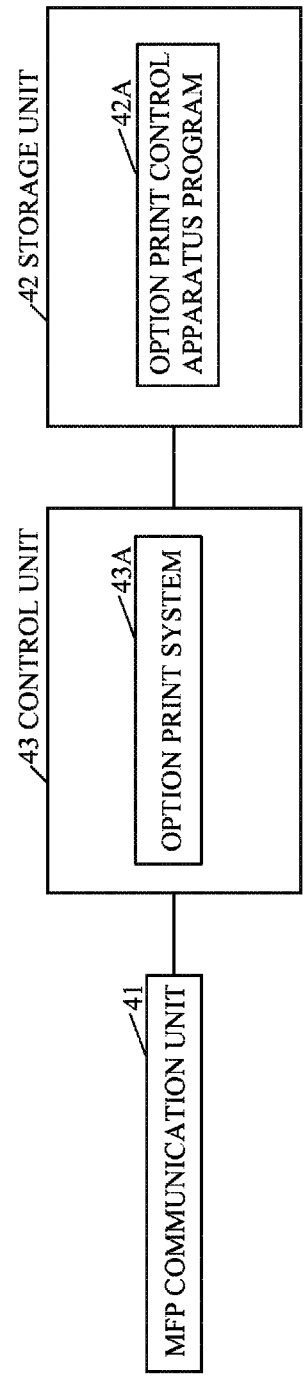
FIG. 5 shows a block diagram illustrating a configuration of an option print control apparatus illustrated in FIG. 2.

FIG. 5 shows a block diagram illustrating a configuration of the option print control apparatus 40.

Referring to FIG. 5, the option print control apparatus 40 includes an MFP communication unit 41, a storage unit 42, and a control unit 43. The MFP communication unit 41 performs communication with the MFP main body 30 (refer to FIG. 3). The storage unit 42 is a storage device, such as an EEPROM or an HDD, capable of storing a variety of information. The control unit 43 controls the entire option print control apparatus 40.

The storage unit 42 stores an option print control apparatus program 42A executed by the option print control apparatus 40.

The control unit 43 includes, for example, a CPU, a ROM that stores programs and a variety of data in advance, and a RAM used as the working area of the CPU. The CPU executes a program stored in the ROM or the storage unit 42.

The control unit 43 executes the option print control apparatus program 42A stored in the storage unit 42 to function as the option print system 43A, which is a print control unit controlling the print engine 33 in the MFP main body 30 in accordance with the print job issued by the job manager 39A in the MFP main body 30.

The option print system 43A performs the drawing process corresponding to the print job. The option print system 43A is capable of instructing the print engine 33 to perform the post-process, such as the punching or the stapling, in accordance with the print job.

The MFP print system 39B in the MFP main body 30 differs from the option print system 43A in the option print control apparatus 40 in at least part of the content of control capable of being performed for the print engine 33. For example, the MFP print system 39B is only capable of setting the stapling for one print job, while the option print system 43A is capable of setting the stapling for a collection of recording media of an arbitrary number on which the printing is continuously performed in one print job.

The MFP print system 39B in the MFP main body 30 operates separately from the option print system 43A in the option print control apparatus 40. In other words, the MFP print system 39B in the MFP main body 30 and the option print system 43A in the option print control apparatus 40 operate at specific timings.

Figure 6:
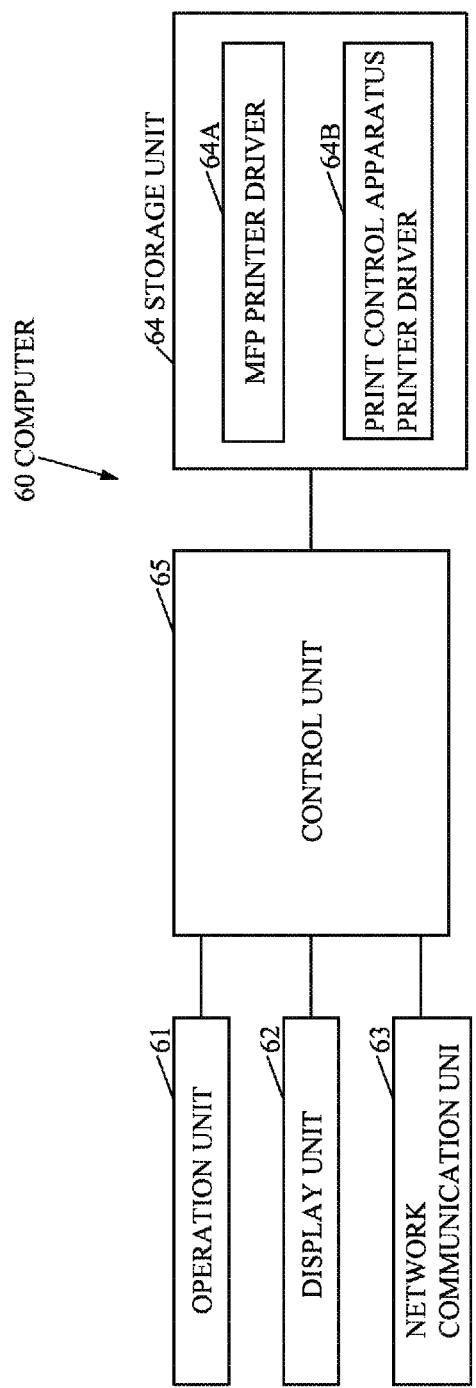
FIG. 6 shows a block diagram illustrating a configuration of a computer illustrated in FIG. 1.

FIG. 6 shows a block diagram illustrating a configuration of the computer 60.

Referring to FIG. 6, the computer 60 includes an operation unit 61, a display unit 62, a network communication unit 63, a storage unit 64, and a control unit 65. The operation unit 61 includes input devices, such as a keyboard and a mouse, with which various operations are input by a user. The display unit 62 is a display, such as a liquid crystal display ("LCD"), which displays a variety of information. The network communication unit 63 performs communication with an external apparatus via the network 11. The storage unit 64 is a storage device, such as a hard disk drive ("HDD"), capable of storing a variety of information. The control unit 65 controls the entire computer 60.

The storage unit 64 stores an MFP printer driver 64A, which is a program causing the MFP main body 30 alone in the MFP 20 to perform printing on a recording medium, and a print control apparatus printer driver 64B, which is a program causing the MFP main body 30 and the option print control apparatus 40 in the MFP 20 to cooperatively perform printing on a recording medium.

The MFP printer driver 64A and the print control apparatus printer driver 64B may be installed in the computer 60 in a manufacturing process of the computer 60, may be additionally installed in the computer 60 from a storage medium, such as a compact disc ("CD"), a digital versatile disk ("DVD"), or a USB memory, or may be additionally installed in the computer 60 from the network 11.

The control unit 65 includes, for example, a CPU, a ROM that stores programs and a variety of data in advance, and a RAM used as the working area of the CPU. The CPU executes a program stored in the ROM or the storage unit 64.

An operations of the network system 10 will be described.

A flow of a print job in the MFP 20 will now be described.

The control unit 39 in the MFP main body 30 scans an image of a document with the scanner 34 upon receiving a copy instruction via the operation unit 31. The control unit 39 requests the job manager 39A to execute the print job based on the image scanned by the scanner 34. The control unit 39 adds a job ID to the print job and, then, associates the job ID with information indicating the "MFP print system print job", which is the job type information about the print job, to store the job ID associated with the above information in the job information 38B in the storage unit 38.

The control unit 39 in the MFP main body 30 requests the job manager 39A to execute the print job based on FAX data upon receiving the FAX data transmitted from an external facsimile apparatus via the facsimile communication unit 35. The control unit 39 adds a job ID to the print job and, then, associates the job ID with the information indicating the "MFP print system print job", which is the job type information, to store the job ID associated with the above information in the job information 38B in the storage unit 38.

The control unit 39 in the MFP main body 30 requests the job manager 39A to execute the print job based on print data upon receipt via the network communication unit 36 of the print data transmitted from the MFP printer driver 64A in the computer 60 via the network communication unit 63. The control unit 39 adds a job ID to the print job and, then, associates the job ID with the information indicating the "MFP print system print job", which is the job type information, to store the job ID associated with the above information in the job information 38B in the storage unit 38.

The control unit 39 in the MFP main body 30 requests the job manager 39A to execute the print job based on print data upon receipt via the network communication unit 36 of the print data transmitted from print control apparatus printer driver 64B in the computer 60 via the network communication unit 63. The control unit 39 adds a job ID to the print job and, then, associates the job ID with information indicating the "option print system print job", which is the job type information about the print job, to store the job ID associated with the above information in the job information 38B in the storage unit 38.

Figure 7:
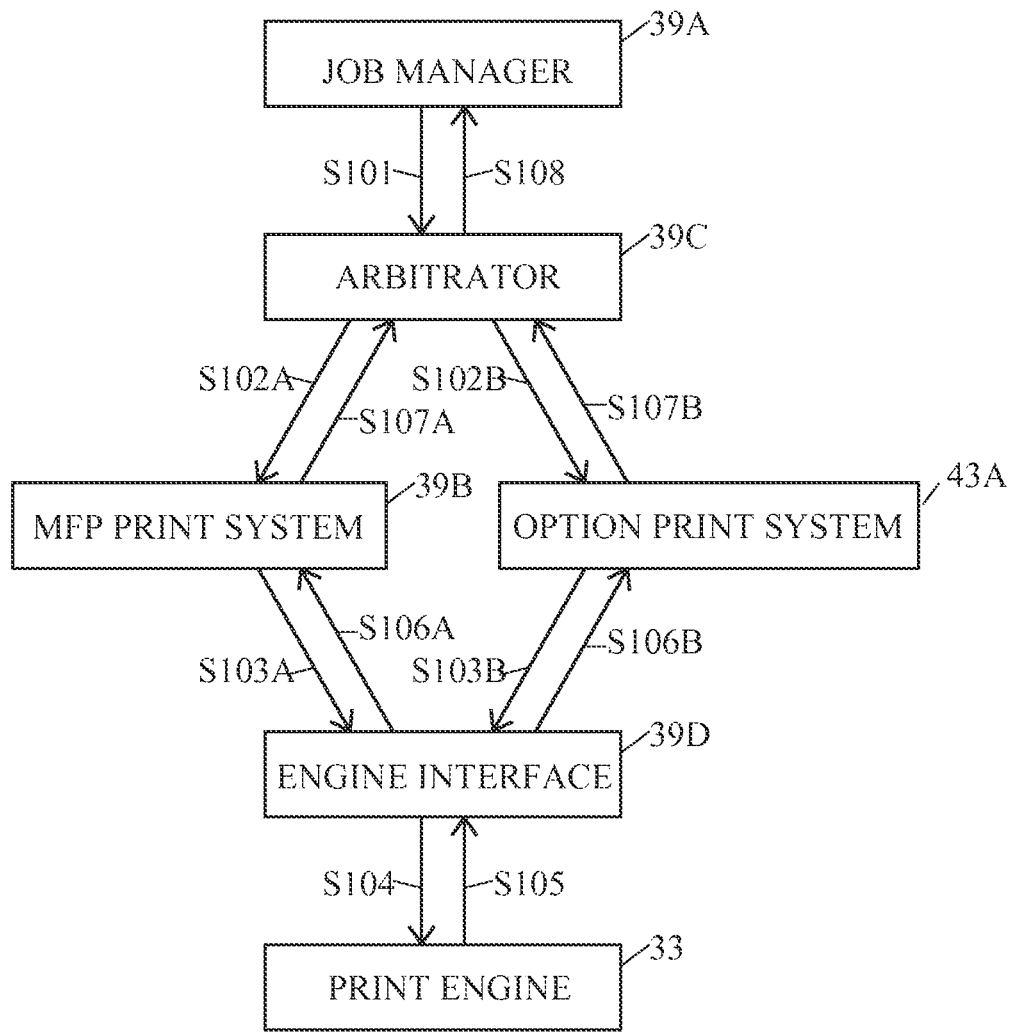
FIG. 7 illustrates a flow of a print job in the MFP illustrated in FIG. 2.

FIG. 7 illustrates a flow of a print job in the MFP 20.

Referring to FIG. 7, in Step S101, the job manager 39A notifies the arbitrator 39C of the print jobs the execution of which is requested in the execution requested order. In other words, the job manager 39A issues the print jobs the execution of which is requested in the execution requested order.

If the print job notified by the job manager 39A in Step S101 is for the MFP print system 39B, in Step S102A, the arbitrator 39C notifies the MFP print system 39B of the print job.

The MFP print system 39B performs, for example, the drawing process corresponding to the print job notified by the arbitrator 39C in Step S102A. In Step S103A, the MFP print system 39B generates pieces of data, which the print engine 33 is to be notified of for every page in the print job, and sequentially notifies the engine interface 39D of the data for every page.

In Step S104, the engine interface 39D sequentially notifies the print engine 33 of the pieces of data for every page notified by the MFP print system 39B in Step S103A.

After the print engine 33 sequentially performs the printing on recording media based on the data for every page notified by the engine interface 39D in Step S104, in Step S105, the print engine 33 sequentially notifies the engine interface 39D of completion of the printing for every page.

In Step S106A, the engine interface 39D sequentially notifies the MFP print system 39B of the completion of the printing for every page, notified by the print engine 33 in Step S105.

If the MFP print system 39B determines that the MFP print system 39B is notified of the completion of the printing of all the pages in the print job by the engine interface 39D, based on the completion of the printing for every page notified by the engine interface 39D in Step S106A, in Step S107A, the MFP print system 39B notifies the arbitrator 39C of the completion of the execution of the print job.

In Step S108, the arbitrator 39C notifies the job manager 39A of the completion of the execution of the print job notified by the MFP print system 39B in Step S107A.

If the print job notified by the job manager 39A in Step S101 is for the option print system 43A, in Step S102B, the arbitrator 39C notifies the option print system 43A of the print job. The print job which the option print system 43A is notified of by the arbitrator 39C is supplied from the arbitrator 39C to the option print system 43A sequentially via the option print control apparatus communication unit 37 in the MFP main body 30 and the MFP communication unit 41 in the option print control apparatus 40.

The option print system 43A performs, for example, the drawing process corresponding to the print job notified by the arbitrator 39C in Step S102B. In Step S103B, the option print system 43A generates pieces of data which the print engine 33 is to be notified of for every page in the print job and sequentially notifies the engine interface 39D of the generated data for every page. The data which the engine interface 39D is notified of by the option print system 43A is supplied from the option print system 43A to the engine interface 39D sequentially via the MFP communication unit 41 in the option print control apparatus 40 and the option print control apparatus communication unit 37 in the MFP main body 30.

In Step S104, the engine interface 39D sequentially notifies the print engine 33 of the pieces of data for every page notified by the option print system 43A in Step S103B.

After the print engine 33 sequentially performs printing on the recording media based on the data for every page notified by the engine interface 39D in Step S104, in Step S105, the print engine 33 sequentially notifies the engine interface 39D of completion of the printing for every page.

In Step S106B, the engine interface 39D sequentially notifies the option print system 43A of the completion of the printing for every page, notified by the print engine 33 in Step S105.

If the option print system 43A determines that the option print system 43A is notified of the completion of the printing of all the pages in the print job by the engine interface 39D, based on the completion of the printing for every page notified by the engine interface 39D in Step S106B, in Step S107B, the option print system 43A notifies the arbitrator 39C of the completion of the execution of the print job.

In Step S108, the arbitrator 39C notifies the job manager 39A of the completion of the execution of the print job notified by the option print system 43A in Step S107B.

Operations of the arbitrator 39C will be described.

An operation of the arbitrator 39C, when the arbitrator 39C is notified of a new print job by the job manager 39A, will now be described.

Figure 8:
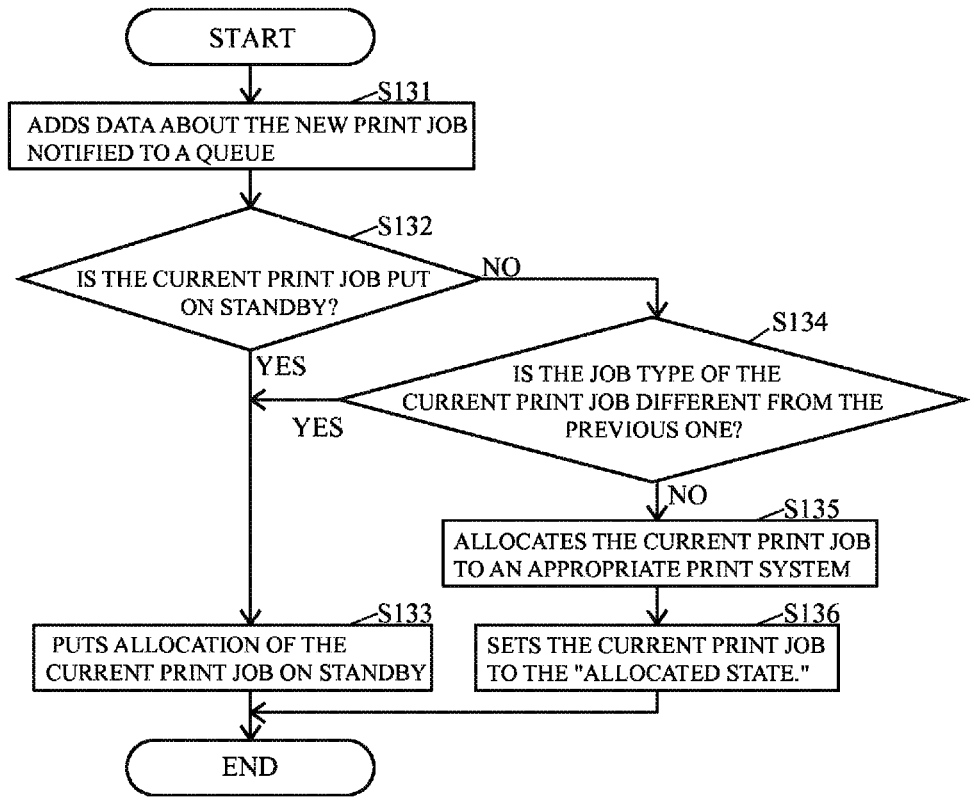
FIG. 8 shows a flowchart illustrating a operation of an arbitrator illustrated in FIG. 3 when the arbitrator is notified of a new print job by a job manager.

FIG. 8 shows a flowchart illustrating an operation of the arbitrator 39C when the arbitrator 39C is notified of a new print job by the job manager 39A. When the arbitrator 39C is notified of a new print job by the job manager 39A, the arbitrator 39C performs the operation illustrated in FIG. 8.

Referring to FIG. 8, in Step S131, the arbitrator 39C adds data about the new print job notified by the job manager 39A to a queue. Such a print job is hereinafter referred to as a "current print job."

FIG. 9A illustrates an example of a queue managed by the arbitrator 39C. FIG. 9B illustrates another example of a queue managed by the arbitrator 39C, which is different from the example of a queue illustrated in FIG. 9A. FIG. 9C illustrates another example of a queue managed by the arbitrator 39C, which is different from the example of queues illustrated in FIG. 9A and FIG. 9B.

Multiple pieces of data are recorded in each of the queues illustrated in FIG. 9A, FIG. 9B, and FIG. 9C. In each piece of data, the job ID of a print job, the job type of the print job, and the state of the print job are associated with each other. The pieces of data having lower orders are input into the queue earlier. Although only the pieces of data about three print jobs are included in each of the queues in FIG. 9A, FIG. 9B, and FIG. 9C, the pieces of data about print jobs of a number greater than three may be included in each queue.

Upon notification of the job ID of the print job by the job manager 39A, the arbitrator 39C acquires the job type of the print job based on the job information 38B in the storage unit 38.

Referring back to FIG. 8, in Step S132, the arbitrator 39C determines whether allocation of a print job notified by the job manager 39A immediately before the current print job (such a print job is hereinafter referred to as a "next previous print job of the current print job") to either of the MFP print system 39B and the option print system 43A is placed on standby.

For example, when the queue including the data about the current print job is in the state illustrated in FIG. 9A, the next previous print job of the current print job (the print job the order of which is "3"), that is, the print job the order of which is "2" is in a "standby state." Accordingly, the arbitrator 39C determines in Step S132 that allocation of the next previous print job of the current print job to either of the MFP print system 39B and the option print system 43A is placed on standby.

In contrast, when the queue including the data about the current print job is in the state illustrated in FIG. 9B or FIG. 9C, the next previous print job of the current print job (the print job the order of which is "3"), that is, the print job the order of which is "2" is in an "allocated state." Accordingly, the arbitrator 39C determines in Step S132 that allocation of the next previous print job of the current print job to either of the MFP print system 39B and the option print system 43A is not placed on standby.

Also when no next previous print job of the current print job exists, the arbitrator 39C determines in Step S132 that allocation of the next previous print job of the current print job to either of the MFP print system 39B and the option print system 43A is not placed on standby.

If the arbitrator 39C determines in Step S132 that allocation of the next previous print job of the current print job to either of the MFP print system 39B and the option print system 43A is placed on standby, in Strep S133, the arbitrator 39C places allocation of the current print job to either of the MFP print system 39B and the option print system 43A on standby. In other words, the arbitrator 39C sets the current print job to the "standby state." For example, when the queue including the data about the current print job is in the state illustrated in FIG. 9A, the arbitrator 39C sets the current print job, that is, the print job the order of which is "3" to the "standby state" in Step S133. Upon completion of the process in Step S133, the operation illustrated in FIG. 8 is terminated.

If the arbitrator 39C determines in Step S132 that allocation of the next previous print job of the current print job to either of the MFP print system 39B and the option print system 43A is not placed on standby, in Strep S134, the arbitrator 39C determines whether the job type of the current print job is different from that of the next previous print job.

For example, when the queue including the data about the current print job is in the state illustrated in FIG. 9B, the job type of the current print job (the print job the order of which is "3"), which is the "MFP print system print job", is different from the job type of the next previous print job of the current print job (the print job the order of which is "2"), which is the "option print system print job." Accordingly, the arbitrator 39C determines in Step S134 that the job type of the current print job is different from that of the next previous print job.

In contrast, when the queue including the data about the current print job is in the state illustrated in FIG. 9C, the job type of the current print job (the print job the order of which is "3"), which is the "MFP print system print job", is the same as the job type of the next previous print job of the current print job (the print job the order of which is "2"), which is the "MFP print system print job." Accordingly, the arbitrator 39C determines in Step S134 that the job type of the current print job is the same as that of the next previous print job.

Also when no next previous print job of the current print job exists, the arbitrator 39C determines in Step S134 that the job type of the current print job is the same as that of the next previous print job.

If the arbitrator 39C determines in Step S134 that the job type of the current print job is different from that of the next previous print job, in Step S133, the arbitrator 39C places allocation of the current print job to either of the MFP print system 39B and the option print system 43A on standby. In other words, the arbitrator 39C sets the current print job to the "standby state." For example, when the queue including the data about the current print job is in the state illustrated in FIG. 9B, the arbitrator 39C sets the current print job, that is, the print job the order of which is "3" to the "standby state" in Step S133. Upon completion of the process in Step S133, the operation illustrated in FIG. 8 is terminated.

If the arbitrator 39C determines in Step S134 that the job type of the current print job is not different from that of the next previous print job, that is, the job type of the current print job is the same as that of the next previous print job, in Step S135, the arbitrator 39C allocates the current print job to an appropriate print system, among the MFP print system 39B and the option print system 43A. Specifically, the arbitrator 39C allocates the current print job to the MFP print system 39B (Step S102A) if the job type of the current print job is the "MFP print system print job" and allocates the current print job to the option print system 43A (Step S102B) if the job type of the current print job is the "option print system print job."

In Step S136, the arbitrator 39C sets the current print job to the "allocated state."

For example, when the queue including the data about the current print job is in the state illustrated in FIG. 9C, the arbitrator 39C allocates the current print job, that is, the print job the order of which is "3" to the MFP print system 39B in Step S135 and, then, sets the print job to the "allocated state" in Step S136. Upon completion of the process in Step S136, the operation illustrated in FIG. 8 is terminated.

An operation of the arbitrator 39C when the arbitrator 39C is notified of completion of execution of a print job by a print system will now be described.

Figure 10:
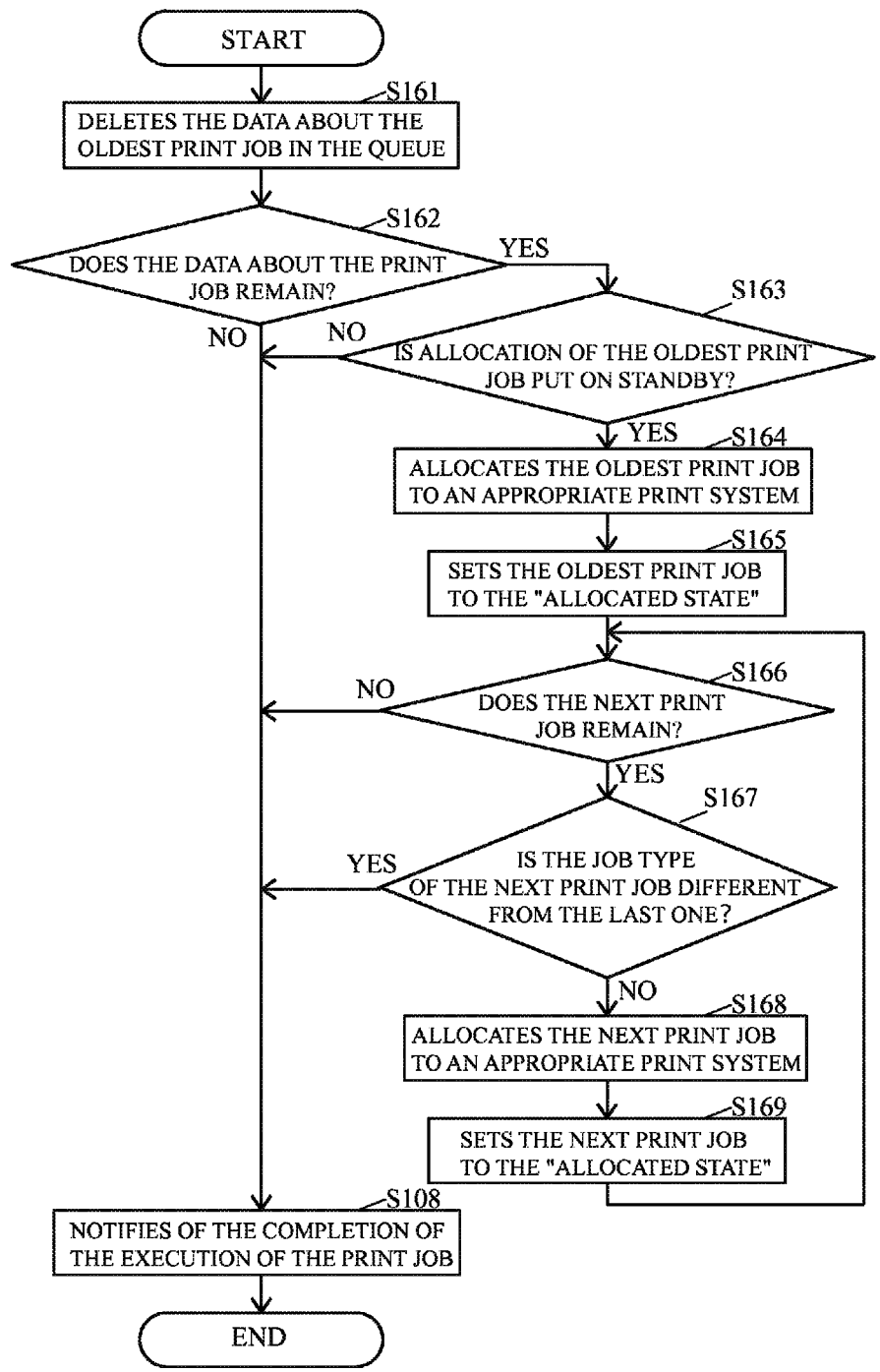
FIG. 10 shows a flowchart illustrating an operation of the arbitrator illustrated in FIG. 3 when the arbitrator is notified of completion of execution of a print job by a print system.

FIG. 10 shows a flowchart illustrating operation of the arbitrator 39C when the arbitrator 39C is notified of completion of execution of a print job by a print system. When the arbitrator 39C is notified of completion of execution of a print job by a print system, the arbitrator 39C performs the operation illustrated in FIG. 10.

Referring to FIG. 10, in Step S161, the arbitrator 39C deletes the data about the print job, the completion of the execution of which is notified by a print system, that is, either of the MFP print system 39B and the option print system 43A from the queue. Specifically, the arbitrator 39C deletes the data about the oldest print job in the queue.

In Step S162, the arbitrator 39C determines whether the data about the print job remains in the queue.

If the arbitrator 39C determines in Step S162 that no data about the print job remains in the queue, in Step S108, the arbitrator 39C notifies the job manager 39A of the completion of the execution of the print job notified by the print system. Then, the operation illustrated in FIG. 10 is terminated.

If the arbitrator 39C determines in Step S162 that the data about the print job remains in the queue, in Step S163, the arbitrator 39C determines whether allocation of the oldest print job to either of the MFP print system 39B and the option print system 43A is placed on standby, as in Step S132.

For example, when the queue immediately before the process in Step S161 is in the state illustrated in FIG. 9A, the oldest print job in Step S163 is the print job the order of which is "2" in FIG. 9A. Since the print job the order of which is "2" is in the "standby state", the arbitrator 39C determines in Step S163 that allocation of the oldest print job to either of the MFP print system 39B and the option print system 43A is placed on standby.

In contrast, when the queue immediately before the process in Step S161 is in the state illustrated in FIG. 9B or FIG. 9C, the oldest print job in Step S163 is the print job the order of which is "2" in FIG. 9B or FIG. 9C. Since the print job the order of which is "2" is in the "allocated state", the arbitrator 39C determines in Step S163 that allocation of the oldest print job to either of the MFP print system 39B and the option print system 43A is not placed on standby.

If the arbitrator 39C determines in Step S163 that allocation of the oldest print job to either of the MFP print system 39B and the option print system 43A is not placed on standby, in Step S108, the arbitrator 39C notifies the job manager 39A of the completion of the execution of the print job notified by the print system. Then, the operation illustrated in FIG. 10 is terminated.

If the arbitrator 39C determines in Step S163 that allocation of the oldest print job to either of the MFP print system 39B and the option print system 43A is placed on standby, in Step S164, the arbitrator 39C allocates the oldest print job to an appropriate print system, among the MFP print system 39B and the option print system 43A, as in Step S135.

In Step S165, the arbitrator 39C sets the oldest print job to the "allocated state", as in Step S136.

For example, when the queue immediately before the process in Step S161 is in the state illustrated in FIG. 9A, the oldest print job in Steps S163 to S165 is the print job the order of which is "2" in FIG. 9A. The arbitrator 39C allocates the print job the order of which is "2" to the option print system 43A in Step S164 and, then, sets the print job to the "allocated state" in Step S165.

In Step S166, the arbitrator 39C determines whether the print job next to the target print job remains in the queue after the process in Step S165. For example, when the target print job immediately before the process in Step S166 is the print job the order of which is "2" in FIG. 9A, the arbitrator 39C determines in Step S166 that the print job next to the print job the order of which is "2", that is, the print job the order of which is "3" in FIG. 9A remains in the queue.

If the arbitrator 39C determines in Step S166 that the print job next to the target print job does not remain in the queue, in Step S108, the arbitrator 39C notifies the job manager 39A of the completion of the execution of the print job notified by the print system. Then, the operation illustrated in FIG. 10 is terminated.

If the arbitrator 39C determines in Step S166 that the print job next to the target print job remains in the queue, in Step S167, the arbitrator 39C determines whether the job type of the next print job is different from that of the last print job, as in Step S134.

For example, when the "last print job" and the "next print job" in Step S167 are the print job the order of which is "2" and the print job the order of which is "3", respectively, in FIG. 9A, the arbitrator 39C determines in Step S167 that the job type of the next print job is different from that of the last print job.

If the arbitrator 39C determines in Step S167 that the job type of the next print job is different from that of the last print job, in Step S108, the arbitrator 39C notifies the job manager 39A of the completion of the execution of the print job notified by the print system. Then, the operation illustrated in FIG. 10 is terminated.

If the arbitrator 39C determines in Step S167 that the job type of the next print job is not different from that of the last print job, in Step S168, the arbitrator 39C allocates the next print job to an appropriate print system, among the MFP print system 39B and the option print system 43A, as in Step S135.

In Step S169, the arbitrator 39C sets the next print job to the "allocated state", as in Step S136. Then, the operation goes back to Step S166.

With the image forming apparatus of the present disclosure, it is possible for the MFP 20 to prevent the sequence of the printing based on the print job for the MFP print system 39B and the printing based on the print job for the option print system 43A from being inappropriately changed by, for example, inversion to be executed by the print engine 33. As a result, it is possible to output the printout based on the print job for the MFP print system 39B and the printout based on the print job for the option print system 43A in an appropriate sequence.

Since the content of control capable of being executed for the print engine 33 by the MFP print system 39B is at least partially different from that for the print engine 33 by the option print system 43A in the MFP 20, the process time of the print job capable of being processed only by the MFP print system 39B by the MFP print system 39B may be significantly different from the process time of the print job capable of being processed only by the option print system 43A by the option print system 43A. In addition, since the MFP print system 39B and the option print system 43A are achieved by different pieces of hardware: the control unit 39 and the control unit 43, respectively, in the MFP 20, the process time of the print job allocated to the MFP print system 39B by the MFP print system 39B may be different from the process time of the print job allocated to the option print system 43A by the option print system 43A. However, it is possible for the MFP 20 to prevent the sequence of the printing based on the print job for the MFP print system 39B and the printing based on the print job for the option print system 43A from being inappropriately changed to be executed by the print engine 33. Accordingly, it is possible to output the printout based on the print job for the MFP print system 39B and the printout based on the print job for the MFP print system 39B in an appropriate sequence.

With the image forming apparatus of the present disclosure, after the MFP 20 allocates the last print job issued by the job manager 39A to the MFP print system 39B, the MFP 20 allocates the next print job issued by the job manager 39A to the MFP print system 39B even if the control by the print engine 33 corresponding to the last print job is not terminated. Accordingly, it is possible for the MFP 20 to reduce the time required for the printing based on the multiple continuous print jobs for the MFP print system 39B, compared with a configuration in which the allocation of the next print job issued by the job manager 39A to the MFP print system 39B is placed on standby when the control by the print engine 33 corresponding to the last print job is not terminated after the MFP 20 allocates the last print job issued by the job manager 39A to the MFP print system 39B.

Similarly, with the image forming apparatus of the present disclosure, after the MFP 20 allocates the last print job issued by the job manager 39A to the option print system 43A, the MFP 20 allocates the next print job issued by the job manager 39A to the option print system 43A even if the control by the print engine 33 corresponding to the last print job is not terminated. Accordingly, it is possible for the MFP 20 to reduce the time required for the printing based on the multiple continuous print jobs for the option print system 43A, compared with a configuration in which the allocation of the next print job issued by the job manager 39A to the option print system 43A is placed on standby when the control by the print engine 33 corresponding to the last print job is not terminated after the MFP 20 allocates the last print job issued by the job manager 39A to the option print system 43A.

Although the image forming apparatus of the present disclosure is the MFP in the above embodiments, an image forming apparatus other than the MFP, such as a printer machine, may be adopted.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An image forming apparatus comprising: a print engine configured to perform printing on a recording medium; a job issuing unit configured to issue a print job for printing by the print engine;
 - two print control units configured to control the print engine in accordance with the print job issued by the job issuing unit; and
 - a job allocating unit configured to allocate the print job to an appropriate print control unit, among the two print control units,
 - wherein, if a last print job is for a first print control unit, among the two print control units, the control of the print engine by the first print control unit in accordance with the last print job allocated to the first print control unit is not completed, and a next print job is for a second print control unit, among of the two print control units, the job allocating unit is further configured to place on standby the allocation of the next print job to the second print control unit,
 - wherein, if the last print job is for the first print control unit, the control of the print engine by the first print control unit in accordance with the last print job allocated to the first print control unit is not completed, and the next print job issued by the job issuing unit is for the first print control unit, the job allocating unit is further configured to allocate the next print job to the first print control unit,
 - wherein the two print control units are different from each other in at least part of the content of control capable of being performed for the print engine,
 - wherein the first print control unit and the second print control unit instruct the print engine to perform a post-process, and
 - wherein the first print control unit sets a stapling for one print job, while the second print control unit sets the stapling for a collection of recording media of an arbitrary number on which the printing is continuously performed in one print job.

2. The image forming apparatus according to claim 1, wherein, if the allocation of the first print job issued by the job issuing unit to either of the print control units is placed on standby, the job allocating unit is further configured to place the allocation of the next print job issued by the job issuing unit to either of the print control units on standby.

3. The image forming apparatus according to claim 1, wherein the two print control units are achieved by different pieces of hardware.

4. An image forming method comprising: performing printing on a recording medium by a print engine; issuing a print job for printing by the print engine;
 - controlling the print engine in accordance with the issued print job by two print control units; and
 - allocating the issued print job to an appropriate print control unit, among the two print control units,
 - wherein, if a last print job that is issued is for a first print control unit, among the two print control units, the control of the print engine by the first print control unit in accordance with the last print job allocated to the first print control unit is not completed, and a next print job that is issued is for a second print control unit, among of the two print control units, the allocation of the next print job to the second print control unit is placed on standby,
 - wherein, if the last print job is for the first print control unit, the control of the print engine by the first print control unit in accordance with the last print job allocated to the first print control unit is not completed, and the next print job issued by the job issuing unit is for the first print control unit, the job allocating unit is further configured to allocate the next print job to the first print control unit, wherein the two print control units are different from each other in at least part of the content of control capable of being performed for the print engine, wherein the first print control unit and the second print control unit instruct the print engine to perform a post-process, and wherein the first print control unit sets a stapling for one print job, while the second print control unit sets the stapling for a collection of recording media of an arbitrary number on which the printing is continuously performed in one print job.

* * * * *